United States Patent
Knobloch et al.

(10) Patent No.: US 10,807,024 B2
(45) Date of Patent: Oct. 20, 2020

(54) FILTER DRUM FOR A VACUUM AND/OR PRESSURE FILTRATION DEVICE

(71) Applicant: ANDRITZ KMPT GmbH, Vierkirchen (DE)

(72) Inventors: Wolfgang Knobloch, Tutzing (DE); Dieter Scherer, Pfaffenhofen (DE)

(73) Assignee: ANDRITZ KMPT GmbH, Vierkirchen (DE)

( * ) Notice: Subject to any disclaimer, the term of this patent is extended or adjusted under 35 U.S.C. 154(b) by 0 days.

(21) Appl. No.: 16/126,129

(22) Filed: Sep. 10, 2018

(65) Prior Publication Data
US 2019/0366245 A1    Dec. 5, 2019

(30) Foreign Application Priority Data
Jun. 5, 2018 (EP) ..................... 18175971

(51) Int. Cl.
*B01D 33/13* (2006.01)
*B01D 33/067* (2006.01)
(Continued)

(52) U.S. Cl.
CPC ........... *B01D 33/13* (2013.01); *B01D 33/067* (2013.01)

(58) Field of Classification Search
CPC ........................... B01D 33/067; B01D 33/801
See application file for complete search history.

(56) References Cited

U.S. PATENT DOCUMENTS

| 919,628 A | 4/1909 | Oliver |
|---|---|---|
| 1,223,245 A | 4/1917 | Biesel |

(Continued)

FOREIGN PATENT DOCUMENTS

| CA | 2161851 A1 | 5/1997 |
|---|---|---|
| CN | 206 103 473 U | 4/2017 |

(Continued)

OTHER PUBLICATIONS

European Patent Office, English abstract of DE 100 05 796 A1, printed on Dec. 20, 2011.

(Continued)

*Primary Examiner* — Benjamin M Kurtz
(74) *Attorney, Agent, or Firm* — Cahn & Samuels, LLP

(57) ABSTRACT

A filter drum including: a drive shaft via which the filter drum is rotatably supportable and rotatably drivable; a filter drum body which is formed in a manner separated from the drive shaft, to which the drive shaft extends centrally and which filter drum body includes a first drum end wall, a second drum end wall, and a drum jacket wall which extends along the drive shaft between the first drum end wall and the second drum end wall and connects the first drum end wall and the second drum end wall to each other; and a first clamping ring set and a second clamping ring set, corresponding to the first drum end wall and the second drum end wall, respectively, by which, in a respective manner, the first drum end wall and the second drum end wall are, via radial clamping, fixedly connected to the drive shaft such that a driving torque applied to the drive shaft is correspondingly transmittable from the drive shaft to the first drum end wall and/or the second drum end wall and, thereby, to the filter drum body via the first clamping ring set and/or the second clamping ring set, respectively. The filter drum can be used in a vacuum and/or pressure filtration device for the filtration of a suspension having solid and liquid components.

18 Claims, 11 Drawing Sheets

Figure 1:
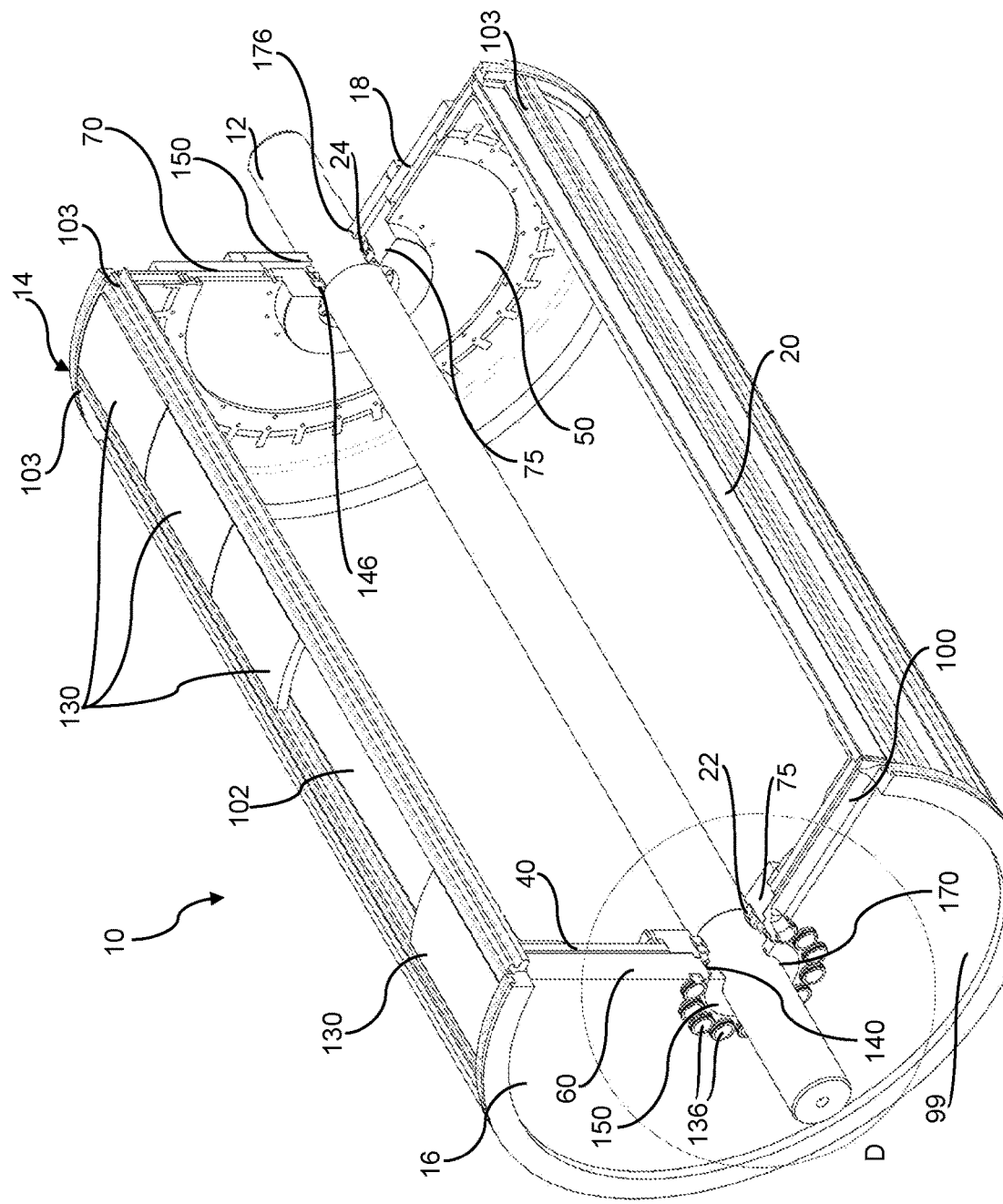

(51) Int. Cl.
   *B01D 33/74*   (2006.01)
   *B01D 35/30*   (2006.01)
   *B01D 33/09*   (2006.01)
   *B01D 33/80*   (2006.01)
   *B01D 33/06*   (2006.01)

(56) References Cited

U.S. PATENT DOCUMENTS

| | | | |
|---|---|---|---|
| 1,453,311 | A | 5/1923 | Engel, Sr. |
| 1,667,465 | A | 4/1928 | Wait |
| 2,092,111 | A | 9/1937 | Dons et al. |
| 2,148,903 | A | 2/1939 | Gamsey |
| 2,362,300 | A | 11/1944 | Nyman |
| 2,823,806 | A | 2/1958 | Harlan |
| 3,061,477 | A | 10/1962 | Lavellee |
| 3,096,280 | A | 7/1963 | Davis et al. |
| 3,235,086 | A | 2/1966 | Krynski |
| 3,306,460 | A | 2/1967 | Luthi |
| 3,363,774 | A | 1/1968 | Luthi |
| 3,494,473 | A | 2/1970 | Krynski |
| 3,630,380 | A | 12/1971 | Barnebl |
| 3,638,798 | A | 2/1972 | Basfeld et al. |
| 3,794,178 | A | 2/1974 | Luthi |
| 3,894,899 | A | 7/1975 | Konopatov et al. |
| 4,354,769 | A * | 10/1982 | Peter .................. F16D 1/093 403/248 |
| 4,442,001 | A | 4/1984 | Davis |
| 4,695,381 | A | 9/1987 | Ragnegard |
| 5,046,338 | A | 9/1991 | Luthi |
| 5,055,205 | A | 10/1991 | White |
| 5,160,434 | A | 11/1992 | Heino et al. |
| 5,281,343 | A | 1/1994 | Lewis et al. |
| 5,683,582 | A | 11/1997 | Luthi |
| 6,488,849 | B2 | 12/2002 | Bertolotti et al. |
| 9,004,289 | B2 | 4/2015 | Hegnauer et al. |
| 9,216,369 | B2 | 12/2015 | Grim et al. |
| 2005/0077254 | A1 | 4/2005 | Sawhill et al. |
| 2005/0161391 | A1 | 7/2005 | Ettlinger |
| 2012/0160761 | A1 | 6/2012 | Hegnauer |

FOREIGN PATENT DOCUMENTS

| | | |
|---|---|---|
| DE | 177 614 B | 9/1964 |
| DE | 10005796 A1 | 8/2001 |
| EP | 0033371 A1 | 8/1981 |
| EP | 2468379 A1 | 6/2012 |
| GB | 2361879 A | 11/2001 |
| WO | 9915255 | 4/1999 |

OTHER PUBLICATIONS

KraussMafei, Labordruckfilter, by 2011.
European Patent Office, English abstract of EP003337, printed on Nov. 29, 2012.
European Patent Office, extended European Search Report for Application No. EP 18 17 5971, dated Nov. 22, 2018.
European Patent Office, English abstract for CN206103473U, printed Feb. 14, 2019.
U.S. Patent and Trademark Office, Final Office Action in U.S. Appl. No. 16/125,981, dated Jan. 16, 2020, pp. 2-10.
U.S. Patent and Trademark Office, Office Action in U.S. Appl. No. 16/125,981, dated Apr. 8, 2020, pp. 2-13.
European Patent Office, English abstract for EP2468379A1, printed Dec. 13, 2019.

* cited by examiner

FILTER DRUM FOR A VACUUM AND/OR PRESSURE FILTRATION DEVICE The claims application claims priority to European Patent Office patent application number 18 175 971.3 filed on Jun. 5, 2018, which is hereby incorporated by reference.

I. FIELD OF THE INVENTION

The invention relates to a filter drum for a vacuum and/or pressure filtration device.

II. SUMMARY OF THE INVENTION

In at least one embodiment of the invention, a filter drum for a vacuum and/or pressure filtration device is created which has a simple design and which allows the use of different material combinations for diverse components of the filter drum and, thereby, allows a composite design of the filter drum in a non-complex manner.

For this, in at least one embodiment of the invention is provided a filter drum for a vacuum and/or pressure filtration device for the filtration of a suspension, which comprises a solid and a liquid. The filter drum includes: a drive shaft (e.g. a drive and support shaft), via which the filter drum is rotatably supportable and rotatably drivable (and which, e.g., extends axially through the filter drum), a filter drum body which is formed in a manner to so as be separated from the drive shaft (, through which, e.g., the drive shaft extends centrally (and axially)) and which includes a first drum end wall and a second drum end wall as well as a drum jacket wall extending, (in the direction) along the drive shaft, between the first and the second drum end walls and connecting the first and second drum end walls to each other, and a first clamping ring set and a second clamping ring set, corresponding to the first drum end wall and the second drum end wall, respectively, by which clamping ring sets, in a respective manner, the first and second drum end walls are, via radial clamping, fixedly connected to the drive shaft such that a driving torque applied to the drive shaft is correspondingly transmittable (e.g. is transmitted) (non-positively (e.g. in a force-locked manner), e.g. only non-positively (e.g. in a force-locked manner only)) from the drive shaft to the first and/or the second drum end wall, and, thereby, to the filter drum body, via the first and/or the second clamping ring set, respectively (e.g. in a corresponding and/or respectively assigned manner).

In at least one embodiment, the clamp fastening of the filter drum body to the drive shaft allows, in a simple manner, to provide the filter drum body of a different material or of different materials than the drive shaft, wherein, nevertheless, with the clamp fastening a secure torque transmission between the filter drum body and the drive shaft can be achieved.

A suitable clamping ring set includes, for example, a radially inner shaft contact ring and a drum end wall contact ring radially outside thereto, which are coaxially interleaved, and a first press ring and a second press ring, the second press ring being axially opposite to the first press ring, which are arranged axially on both sides between the two contact rings as well as in a coaxial manner thereto and which are axially movable toward each other, wherein, in line with such a motion axially toward each other, they force the two contact rings radially apart from each other such that the shaft contact ring is pressed, all around, radially and inwardly against the drive shaft, and that the drum end wall contact ring is pressed, all around, radially and outwardly against the drum end wall (e.g. against an inner end wall/end jamb of a through hole present in the drum end wall or against a connection ring arranged between the clamping ring set and the drum end wall). The two press rings may, for example, be axially movable toward each other via screw connections. To this end, for example, a number of threaded holes are formed in the one press ring and a corresponding number of through holes, which are aligned to the threaded holes, are formed in the other press ring, and a corresponding number of screws extend axially through the through holes and are engaged with the threaded holes to thereby allow to pull the press rings axially toward each other. This design, however, only represents one possible form of a clamping ring set, and the person skilled in the art will also consider other clamping ring structures, with which a corresponding clamp fastening between the drive shaft and the respective drum end wall is achievable.

The drive shaft may be formed in one part and, as described above as an example, may be a drive shaft centrally extending through the filter drum. If, in this case, a driving torque is, for example, applied to the drive shaft only on one end thereof, then the driving torque is primarily transmitted to the filter drum by this clamping ring set, which is located more proximal to this one end, wherein the other clamping ring set, which is located more distal to this one end of the drive shaft, then rather merely has the function(s) to transmit and/or receive other rotational bearing reactions/forces.

The drive shaft may also include a first drive shaft element and a second drive shaft element which are (axially separated along the drive shaft and/or) separate from each other and are aligned to each other, wherein the drive shaft is fixedly connected to the first drum end wall via its first drive shaft element by the first clamping ring set via radial clamping, and wherein the drive shaft is fixedly connected to the second drum end wall via its second drive shaft element via radial clamping. If, in this case, the driving torque is applied to only one of the first and second drive shaft elements of the drive shaft, then the driving torque is transmitted to the filter drum only by this one of the first and second drive shaft elements, wherein the other one of the first and second drive shaft elements merely has the function(s) to transmit and/or receive other rotational bearing reactions/forces.

As explained in the following, with the above explained design/construction of the filter drum, a composite construction of the filter drum body may be achieved in a simple way in at least one embodiment, which allows to assign different functions and different materials to the diverse composite components of the filter drum body in line with their diverse purposes (e.g. with respect to load transference or filtrate discharge).

The first and second drum end walls may, for example, respectively include a load-bearing inner support ring plate and an outer cover ring plate which is supported (and/or held) by the support ring plate, wherein the first and second clamping ring sets are arranged between the drive shaft and the support ring plate of the respectively assigned first and second drum end walls such that the driving torque is transmitted, via the first clamping ring set and/or the second clamping ring set, from the drive shaft to the respectively assigned support ring plate and, thereby, to the filter drum body (and/or to the filter drum).

At least one of the two cover ring plates may, for example, be formed as a functional ring plate, in which discharge channels for discharging a filtrate, occurring during filtration, are formed (e.g. are integrally formed).

The drum jacket wall, for example, includes a load-bearing inner support jacket and an outer functional jacket, on which a filter medium of the filter drum is arranged and via which a filtrate occurring during filtration is discharged and which is supported by the support jacket.

For example, the support jacket and the support ring plates are rigidly connected to each other to thereby form a load-bearing inner structure, wherein this load-bearing inner structure is encapsulated in a fluid tight manner toward the outside by the functional jacket and the cover ring plate(s) so as to be isolated, during filtration operation, against a contact touch with the suspension surrounding the filter drum.

The cover ring plates and the functional jacket are, for example, of a different material than the support ring plates and the support jacket.

The cover ring plates and the functional jacket are, for example, of a same material, and the support ring plates and the support jacket are, for example, of a same material.

The cover ring plate and the functional jacket are, for example, of a plastic material. The support ring plates and the support jacket are, for example, of a weldable metal material and are fixedly welded to each other to thereby form the load-bearing inner structure.

For example, a first central through hole is defined by the support ring plate as well as by the cover ring plate of the first drum end wall, and a second central through hole is defined by the support ring plate as well as by the cover ring plate of the second drum end wall, wherein the first and second through holes respectively are coaxial to the drive shaft and are penetrated by the drive shaft, and wherein a sealing device is arranged between the drive shaft and the cover ring plate of both the first drum end wall and the second drum end wall, by which (sealing device) the respective cover ring plate of the first drum end wall and the second drum end wall is fluidly sealed against the drive shaft such that, during the filtration operation, the support ring plates are, at the respective drum face end-sided entrance sites of the drive shaft into the filter drum (and/or into the filter drum body), isolated against a contact touch with the suspension surrounding the filter drum.

The respective sealing device is, for example, formed by a sealing ring, wherein the sealing ring optionally includes a rigid ring component and a radially inner elastic O-ring and a radially outer elastic O-ring, which O-rings, in an elastically biased manner, abut against the drive shaft and the assigned cover ring plate to, thereby, create/achieve a fluid tight sealing between the respective cover ring plate and the drive shaft.

The drive shaft is, for example, coated with a plastic coating at least in the region of respective drum end face-sided entrance sites of the drive shaft into the filter drum, wherein the drive shaft is, for example, coated at all sites, which protrude from the filter drum, or, possibly, (is coated) also substantially entirely. At those regions, on which the first and second clamping ring sets are arranged and/or act on(to) the drive shaft, the drive shaft, e.g., is not coated.

The respective cover ring plate is, for example, formed of a plastic plate material or is equipped with a coating of a plastic plate coating material, and the respective sealing device is, for example, formed by a sealing ring, which is made of a plastic ring material or which is equipped with a plastic ring coating material. At the respective sealing device, for example, the plastic ring material or the plastic ring coating material is welded to the plastic coating of the drive shaft and to the plastic plate material or the plastic plate coating material to thereby form a non-load-bearing fluid sealing between the respective sealing ring and the drive shaft and the respective cover ring plate.

The afore-described diverse structures allow the use of such a plastic material as plastic materials for the diverse components and/or coatings, which (plastic material) is insensitive in regards of the suspension present outside, wherein the stability of the respective plastic material is not to be minded since the load-bearing and torque-receiving components are received by the support components located inside, for example, the support ring plates and the support jacket, and/or the load-bearing inner structure. As these support components located inside and the drive shaft, in their turn, are easily encapsulatable and/or encapsulated toward the outside by the coatings and cover ring plates, located outside, and the functional jacket, the load-bearing support components may be manufactured of a material assigned to the bearing function, wherein a non-sensitivity of this material with regards to a touch with the suspension does not have to be minded.

In at least one embodiment of the invention further provides a vacuum and/or pressure filtration device for the filtration of a suspension, which comprises a solid and a liquid. The vacuum and/or pressure filtration device includes a filter drum as described herein which is, by its drive shaft, rotatably supported around a shaft axis defined by the drive shaft, and a driving motor which is connected to the drive shaft, wherein a driving torque applied to the drive shaft by the driving motor is transmitted to the filter drum body (and/or to the filter drum) via the first clamping ring set and/or the second clamping ring set.

III. BRIEF DESCRIPTION OF THE DRAWINGS

Figure 2:
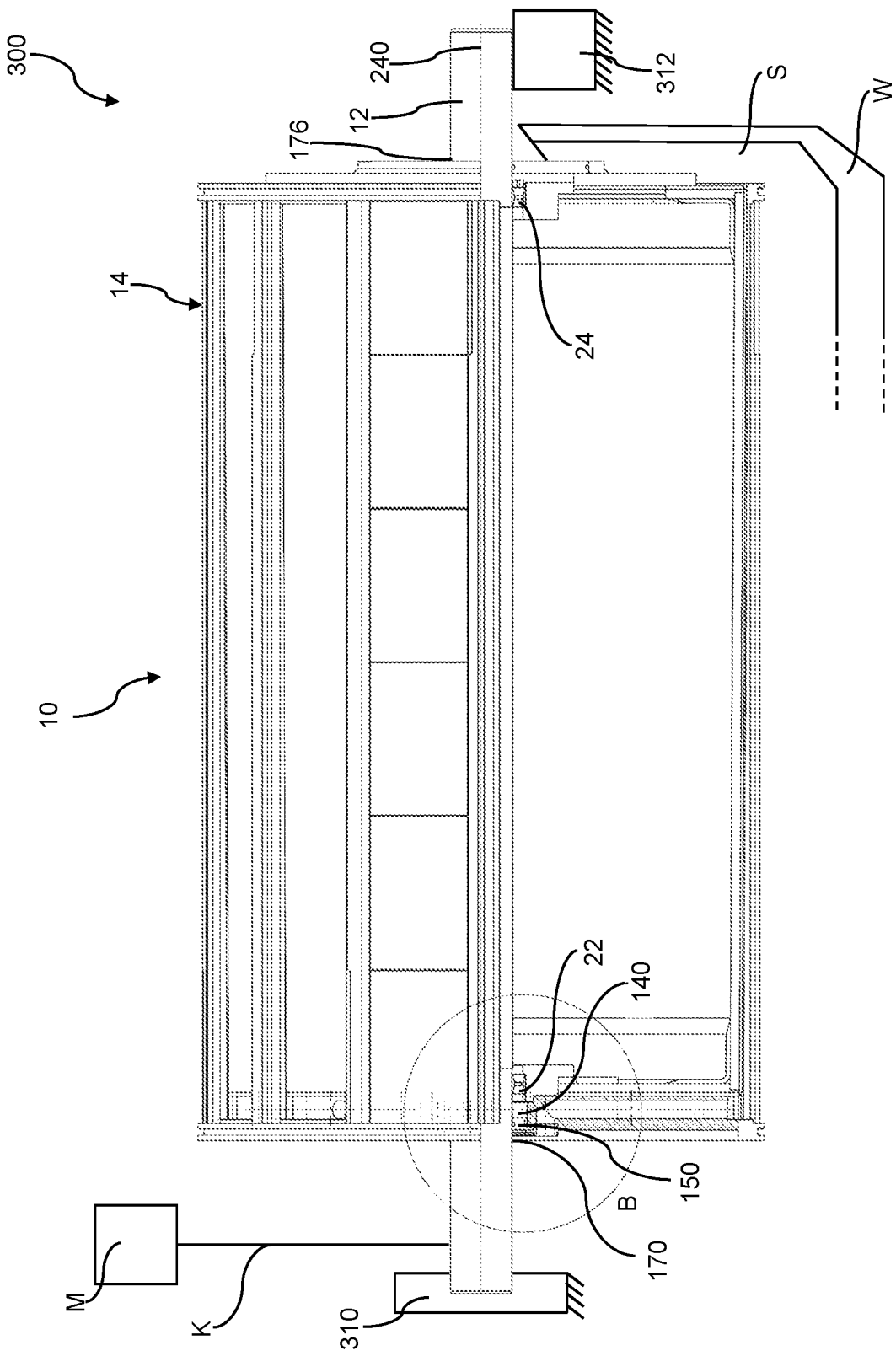
Figure 3:
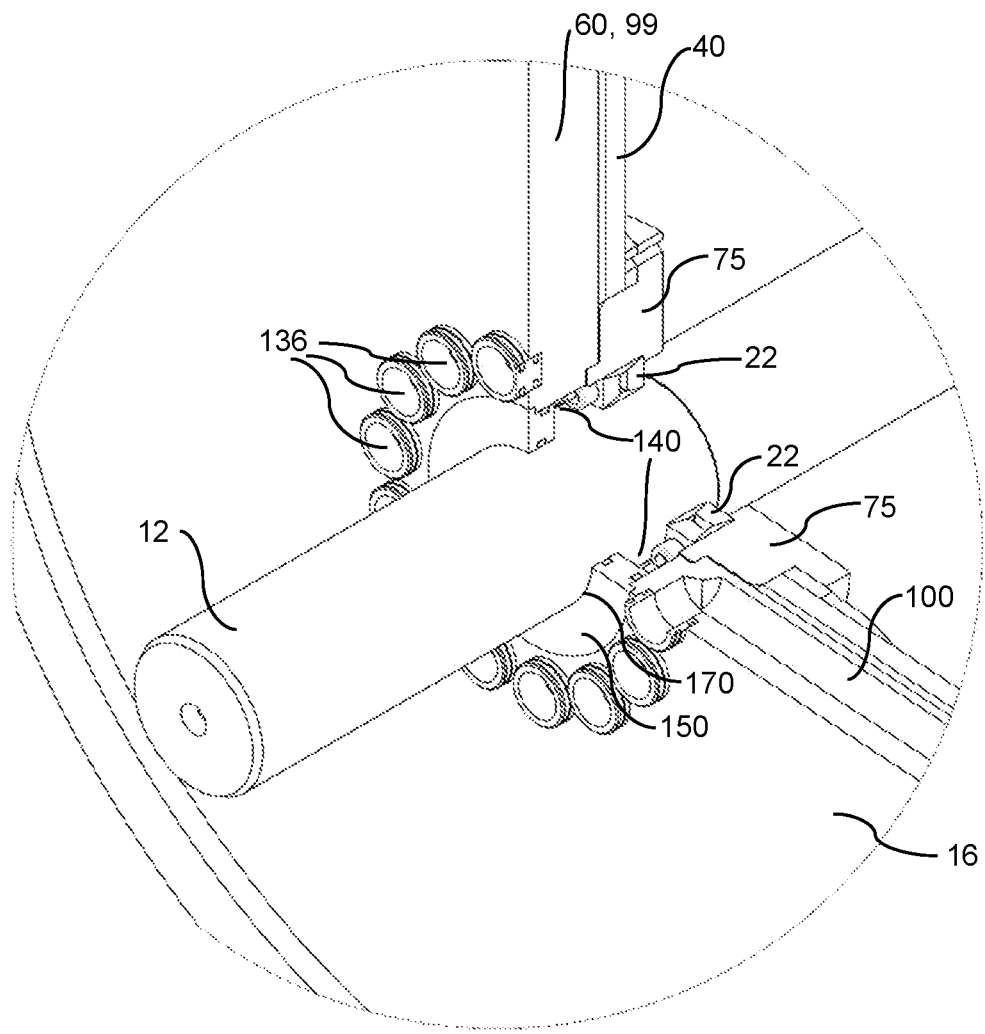
Figure 4:
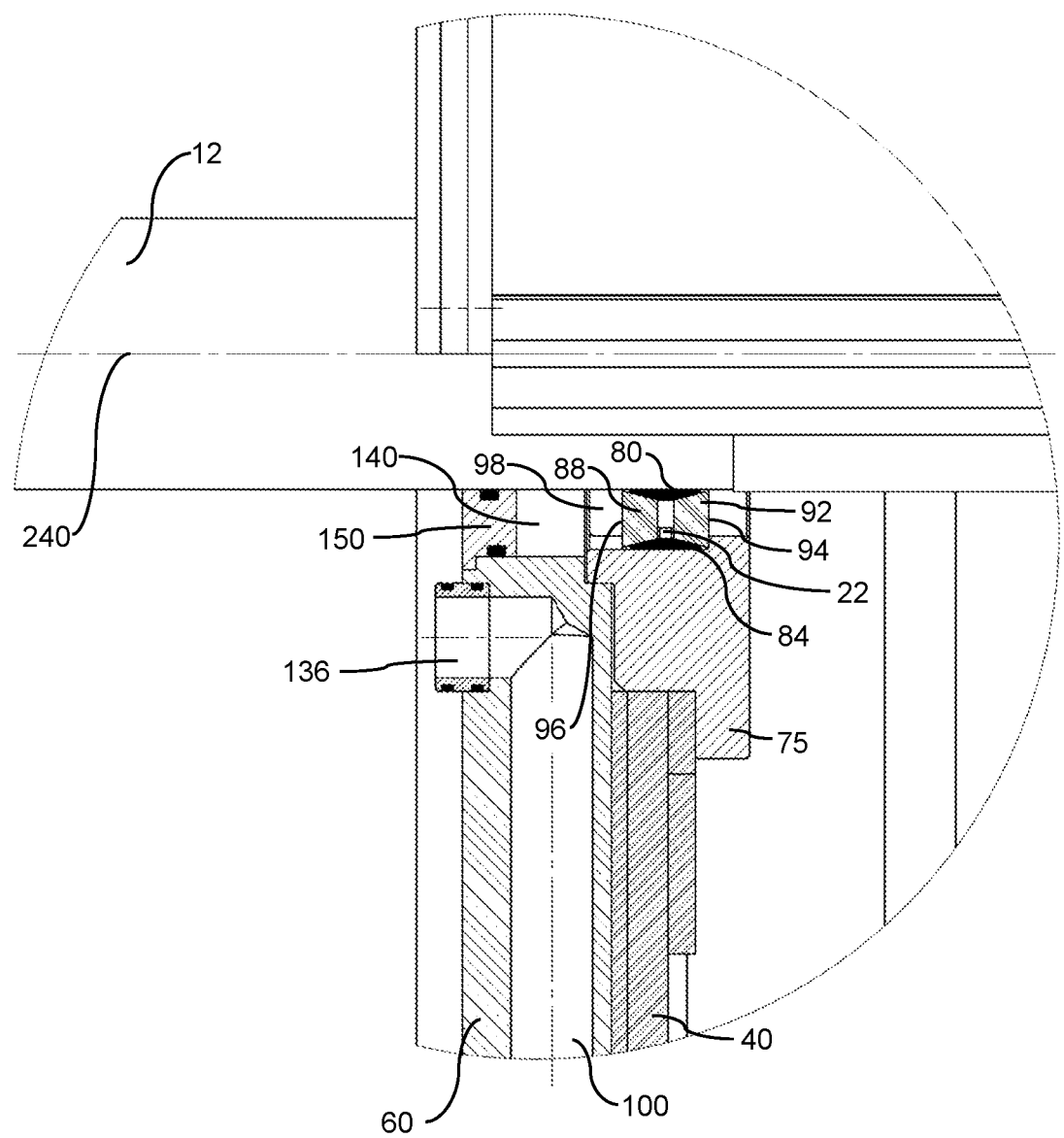
Figure 5:
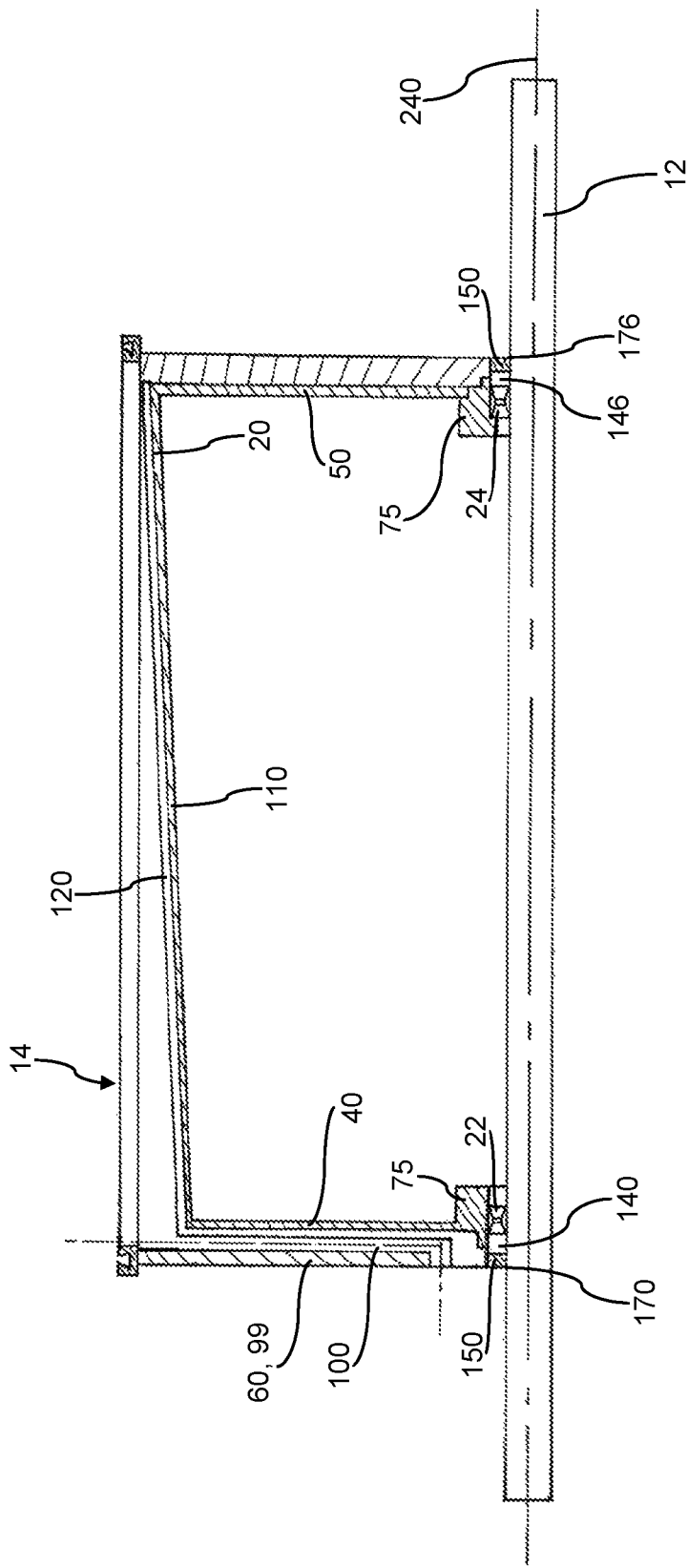
Figure 9:
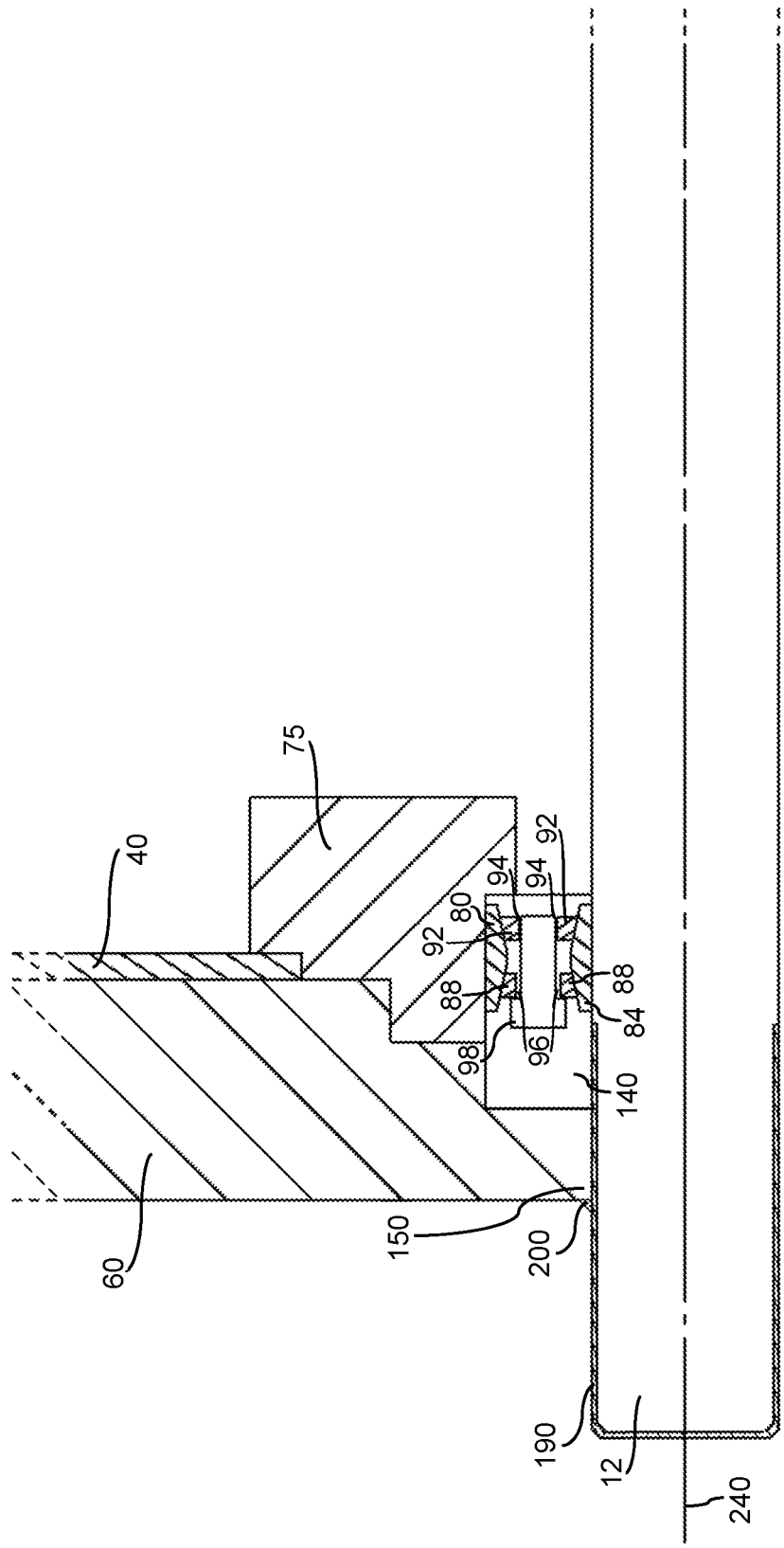
Figure 10:
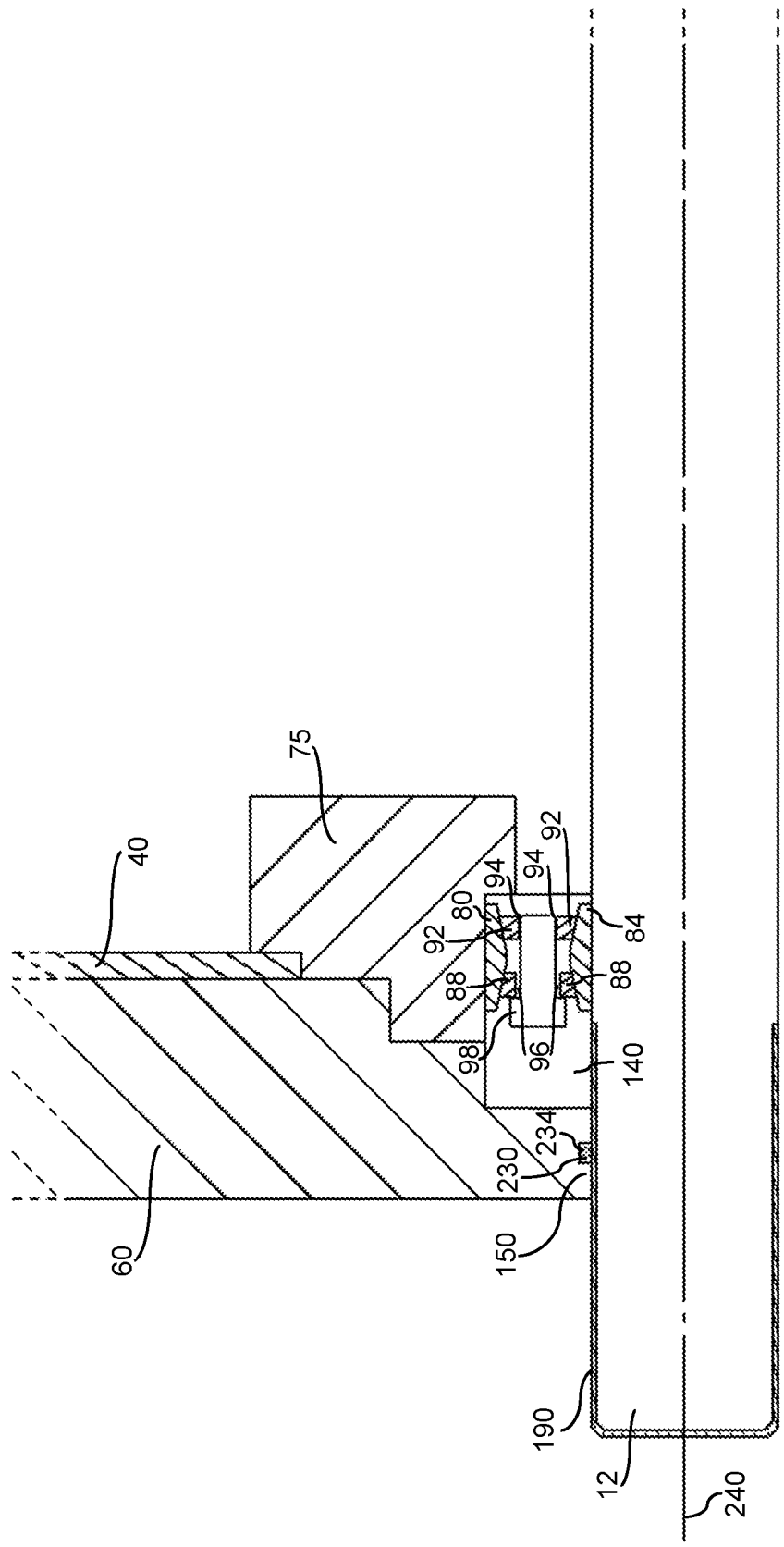
Figure 11:
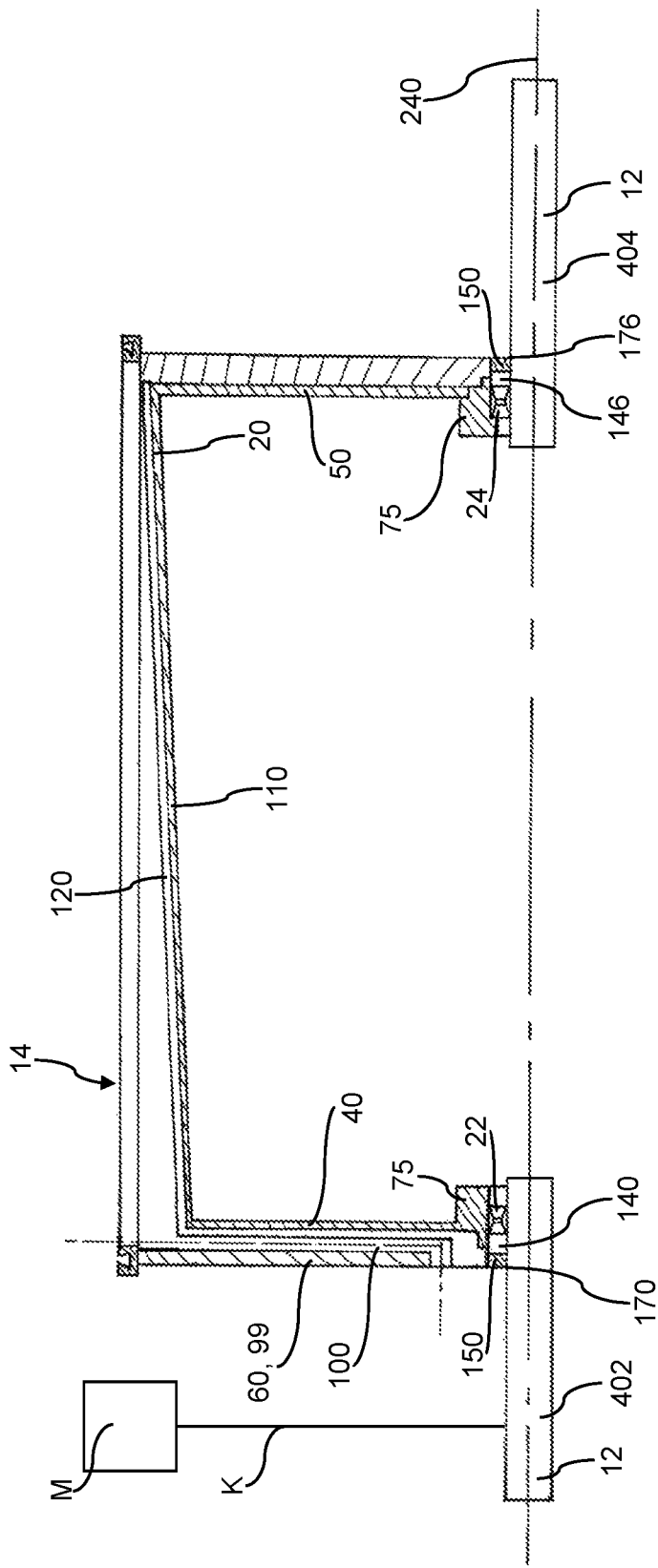

Hereafter, the invention is explained by diverse embodiments with reference to the figures. In the figures:

FIG. 1 shows a schematic view of a vacuum and/or pressure filtration device with a sectioned perspectively shown filter drum, FIG. 2 shows a longitudinal partial sectional view of the filter drum of FIG. 1, FIG. 3 shows a detailed view of the detail D of the filter drum of FIG. 1, FIG. 4 shows a detailed view of the detail B of the filter drum of FIG. 2, FIG. 5 shows a schematic longitudinal partial sectional view of the filter drum of FIG. 1, FIGS. 6-10 show schematic longitudinal partial sectional views of the filter drum according to embodiments, and FIG. 11 shows a schematic longitudinal partial sectional view of the filter drum according to another embodiment.

IV. DETAILED DESCRIPTION OF THE DRAWINGS

As apparent from the figures, a filter drum 10 for a vacuum and/or pressure filtration device for the filtration of a suspension S, which comprises a solid and a liquid, includes: a drive shaft 12 which extends through the filter drum 10 and via which the filter drum 10 is rotatably supportable and rotatably drivable; a filter drum body 14 which is formed in a manner so as to be separated from the drive shaft 12, through which the drive shaft 12 extends centrally and which includes a first drum end wall 16 and a second 18 drum end wall as well as a drum jacket wall 20 which, along the drive shaft 12, extends between the first 16 and second 18 drum end walls and connects the first 16 and second 18 drum end walls to each other; and a first clamping ring set 22 and a second 24 clamping ring set, corresponding to the first drum end wall 16 and the second drum end wall 18, respectively, by which (clamping ring sets 22, 24), in a respective manner, the first 16 and second 18 drum end walls are, via radial clamping, fixedly connected to the drive shaft 12 such that a driving torque applied to the drive shaft 12 is (correspondingly) transmitted from the drive shaft 12 to the first 16 and second 18 drum end walls and, thereby, to the filter drum body 14, via the first 22 and second 24 clamping ring sets. In the case that the driving torque is applied to the drive shaft 12 only on one end thereof, the driving torque is primarily transmitted to the filter drum body 14 by that one of the first and second clamping ring sets 22, 24, which is located more proximal to this end, wherein the other one of the first and second clamping ring sets 22, 24, e.g. also depending on the length of the drive shaft 12, then rather merely has the function(s) to transmit and/or receive rotational bearing reactions/forces.

In the embodiments shown in the figures, the first 16 and second 18 drum end walls of the filter drum 10, e.g., respectively include a load-bearing inner support ring plate 40, 50 and an outer cover ring plate 60, 70, which outer cover ring plates 60, 70 are supported by the respective support ring plate 40, 50. The first 22 and second 24 clamping ring sets are arranged (e.g., corresponding/assigned to the first 16 and second 18 drum end walls, respectively) between the drive shaft 12 and the support ring plate 40, 50 of the respectively assigned first 16 and second 18 drum end walls such that the driving torque is, via the first 22 and second 24 clamping ring sets, transmitted from the drive shaft 12 to the respectively assigned support ring plate 40, 50 and, thereby, to the filter drum body 14 and/or to the filter drum 10.

In the example embodiments shown in the figures, the first drum end wall 16 and the second drum end wall 18 (and/or the inner support ring plates 40, 50 thereof) include, respectively on their inner circumference facing the drive shaft 12, a respective connection ring 75 which extends around the drive shaft 12 and onto which, in a respectively assigned manner, the first and the second clamping ring set 22, 24 act, such that the torque is, via the respective connection ring 75, transmitted to the first and second drum end walls 16, 18 (and/or to the support ring plates 40, 50 thereof) and, thereby, to the filter drum body 14.

In the figures, a possible clamping ring set 22, 24 is shown. The illustrated clamping ring set 22, 24 includes a radially inner shaft contact ring 80 and a drum end wall contact ring 84, which is radially outside thereto (to the shaft contact ring 80), which are coaxially interleaved, and a first press ring 88 and a second 92 press ring, the second press ring 92 being axially opposite to the first press ring 88, which are, axially on both sides, arranged (radially) between the two contact rings 80, 84 as well as in a manner so as to be coaxial thereto and which are axially movable toward each other.

The first and second press rings 88, 92 are, in cross section, formed in a manner so as to be axially tapered toward each other (see, e.g., FIG. 4), and the shaft contact ring 80 and the drum end wall contact ring 84 form, in cross section, two seats, which are complimentary to the cross-sections of the press rings 88, 92 and which conically expand in a direction axially away from each other and in/on which (seats) the press rings 88, 92 are received.

In this configuration, when the press rings 88, 92 are axially moved toward each other, then the two press rings 88, 92 force the two contact rings 80, 84 radially apart from each other such that the shaft contact ring 80 is, all around, pressed radially and inwardly against the drive shaft 12, and the drum end wall contact ring 84 is, all around, pressed radially and outwardly against the inner drum end wall 16, 18 and/or the connection ring 75 thereof.

For axially moving the two press rings 88, 92, e.g., a number of threaded holes 94 are formed in the one press ring 92, and, e.g., a corresponding number of through holes 96, which are aligned to the threaded holes 94, are formed in the other press ring 88, and, e.g., a corresponding number of screws 98 axially extend through the through holes 96 and are engaged with the threaded holes 94, whereby the press rings 88, 92 may be axially pulled toward each other.

Nevertheless, the invention is not limited to this specific structure for a clamping ring set, but also other clamping ring sets known in the art may be used, provided that, thereby, a load-bearing and/or torque-transmitting (non-positive (e.g. force-locked)) connection between the drive shaft 12 and the respective drum end wall 16, 18 can be achieved via clamping (e.g. via clamping only). For example, a possible clamping ring set (not shown) may include a radially inner shaft contact ring and a drum end wall contact ring, which is radially outside thereto (to the radially inner shaft contact ring), which are coaxially interleaved. A radial outer circumferential surface of the drum end face contact ring and a radially inner circumferential surface of the shaft contact ring respectively are substantially cylindrical and correspond to the drum end wall 16, 18 and/or here to the respective connection ring 75 and/or to the drive shaft 12. A radially inner surface of the drum end wall contact ring and a radially outer surface of the shaft contact ring are formed in a manner so as to be complimentary to each other in a conical manner and abut against each other. In line with a motion of these two contact rings in a direction axially toward each other, the shaft contact ring is, all around, pressed against the drive shaft 12 radially and inwardly, and the drum end face contact ring is, all around, pressed against the drum end wall 16, 18 and/or here against the respective connection ring 75 radially and outwardly. For axially moving these two contact rings, e.g., a number of threaded holes are formed in the one contact ring and a corresponding number of through holes, which are aligned to the threaded holes, are formed in the other contact ring, and a corresponding number of screws extend axially through the through holes and are engaged with the threaded holes to, thereby, being capable of pulling the contact rings toward each other.

In the example embodiments shown in the figures, e.g., the one 60 of the two cover ring plates 60, 70 is formed as a functional ring plate 99, in which discharge channels 100 for discharging a filtrate, occurring during the filtration, are formed. The discharge channels 100 correspond to the respective filter cells 102 which are defined by the drum jacket wall 20 and separator bars 103 which, along the filter drum 10, extend between the first 16 and second 18 drum end walls. Both cover ring plates 60, 70 may be formed as functional ring plates as described herein.

In the example embodiments shown in the figures, the drum jacket wall 20, for example, includes a load-bearing inner support jacket 110 and an outer functional jacket 120, on which (outer functional jacket 120) a filter medium 130 of the filter drum 10 is arranged and via which (outer functional jacket 120) a filtrate, occurring during the filtration, is discharged and which (outer functional jacket 120) is supported by the support jacket 110. The filter medium 130 may be held (e.g. fixed) by the separator bars 103, wherein a respective filter medium 130 may be assigned to each filter cell 102; i.e., the filter medium 130 may be formed by a plurality, corresponding to the number of filter cells 102, of filter media 130 which are separate to each other.

The outer functional jacket 120 may, for example, be formed of a plastic material or of a metallic or ceramic material which is respectively selected such that it is insensitive, e.g. (corrosion-)resistant, against a touch/contact with the suspension and/or the filtrate. Further or alternatively, the outer functional jacket 120 may also be coated with such a (as previously mentioned) plastic material or such a (as previously mentioned) metallic or ceramic material.

In the example embodiments shown in the figures, e.g., the support jacket 110 and the support ring plates 40, 50 are rigidly connected to each other to thereby form a load-bearing inner structure, wherein this load-bearing inner structure is, by the functional jacket 120 and the cover ring plates 60, 70, encapsulated in a fluid tight manner toward the outside so as to be, during the filtration operation, isolated against a contact touch with the suspension S surrounding the filter drum 10.

The cover ring plates 60, 70 may, for example, be formed of a plastic material or of a metallic or ceramic material which is respectively selected such that it is insensitive and/or (corrosion-)resistant with regards to a contact touch with the suspension and/or the filtrate. Further, the cover ring plates 60, 70 may be coated with such a plastic material (as previously mentioned) or such a metallic or ceramic material (as previously mentioned).

The functional jacket 120 as well as, e.g., the cover ring plates 60, 70, for example, are respectively formed of a plastic material or are coated with a plastic material, which plastic material and/or which plastic materials are weldable to each other. Here, the functional jacket 120 and the cover ring plates 60, 70 are welded to each other via their plastic material to thereby form a fluid tight encapsulation, wherein the (respective) (plastic) welded connection(s) between the functional jacket 120 and the cover ring plates 60, 70 is/are not load-bearing. The support ring plates 40, 50 and the support jacket 110, for example, are respectively of a metal material and are welded to each other to thereby form a (respective) load-bearing welded connection.

Circumferentially around the drive shaft 12, a number/plurality of discharge channel connection openings 136 are formed (e.g. integrally formed) in the one drum end wall 16 and/or in the cover ring plate 60 thereof, which is formed as a functional ring plate 99, which (discharge channel connection openings) are assigned to a respective filtrate discharge channel 100 and which (discharge channel connection openings), during the filtration operation, are connected to a not-shown control head, via which (control head) a vacuum and/or an air pressure can be supplied in a controlled manner to the respective discharge channel 100 and, thereby, to the filter cell 102, which is fluidly connected thereto (to the respective discharge channel 100), in accordance with the rotation of the filter drum 10.

A first central through hole 140 is defined by the support ring plate 40 as well as by the cover ring plate 60 of the first drum end wall 16, and a second central through hole 146 is defined by the support ring plate 50 as well as by the cover ring plate 70 of the second drum end wall 18. The first 140 and second 146 through holes are respectively coaxial to the drive shaft 12 and are penetrated by the drive shaft 12.

A sealing device 150 is respectively arranged between the drive shaft 12 and the respective cover ring plate 60, 70 of the first 16 and second 18 drum end walls, by which (sealing device 150) the respective cover ring plate 60, 70 of the first 16 and second 18 drum end walls is fluidly sealed against the drive shaft 12 so that, during filtration operation, at the respective drum end face-sided entrance sites 170, 176 of the drive shaft 12 into the filter drum 10, the support ring plates 40, 50 are isolated against a contact touch with the suspension S surrounding the filter drum 10.

As shown in the FIGS. 6 to 10, the drive shaft 12 may be coated with a plastic coating 190 at least in the region of respective drum end face-sided entrance sites 170, 176 of the drive shaft 12 into the filter drum 10 and/or also in the entire region which is located outside of the filter drum 10. The plastic coating 190 may be formed of a plastic material which is weldable, for example weldable to the plastic material of the cover ring plates 60, 70. In the case of such a plastic coating 190 (as previously mentioned), the sealing is realized by the sealing device 150, e.g., between the respective cover ring plate 60, 70 of the first 16 and the second 18 drum end walls and the plastic coating 190 of the drive shaft 12.

Figure 6:
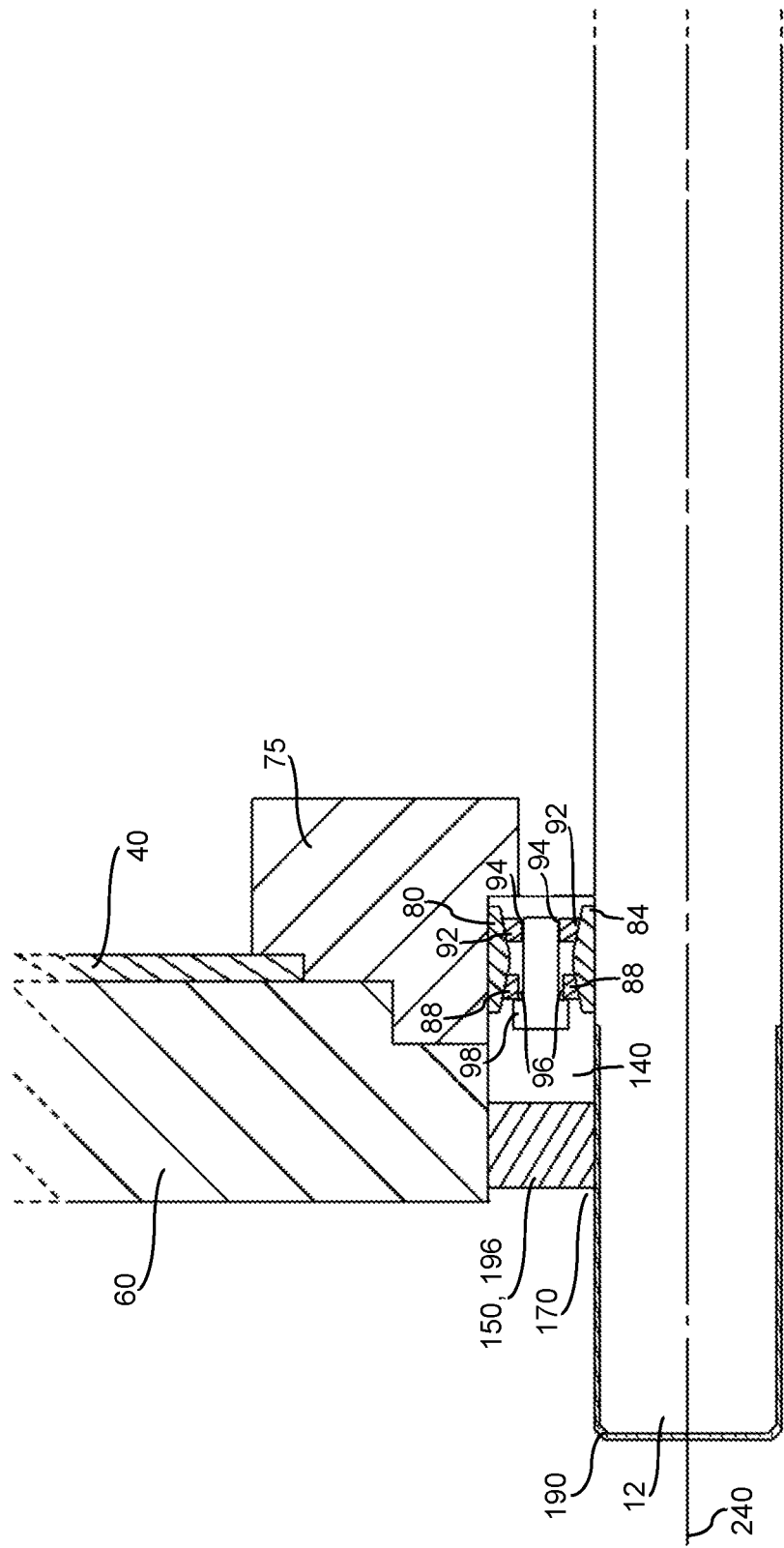

In the following, different embodiments of the sealing device 150 are described. As shown in FIG. 6, the sealing device 150 may be formed of a sealing body 196 which, for example, is an adhesive element.

Figure 7:
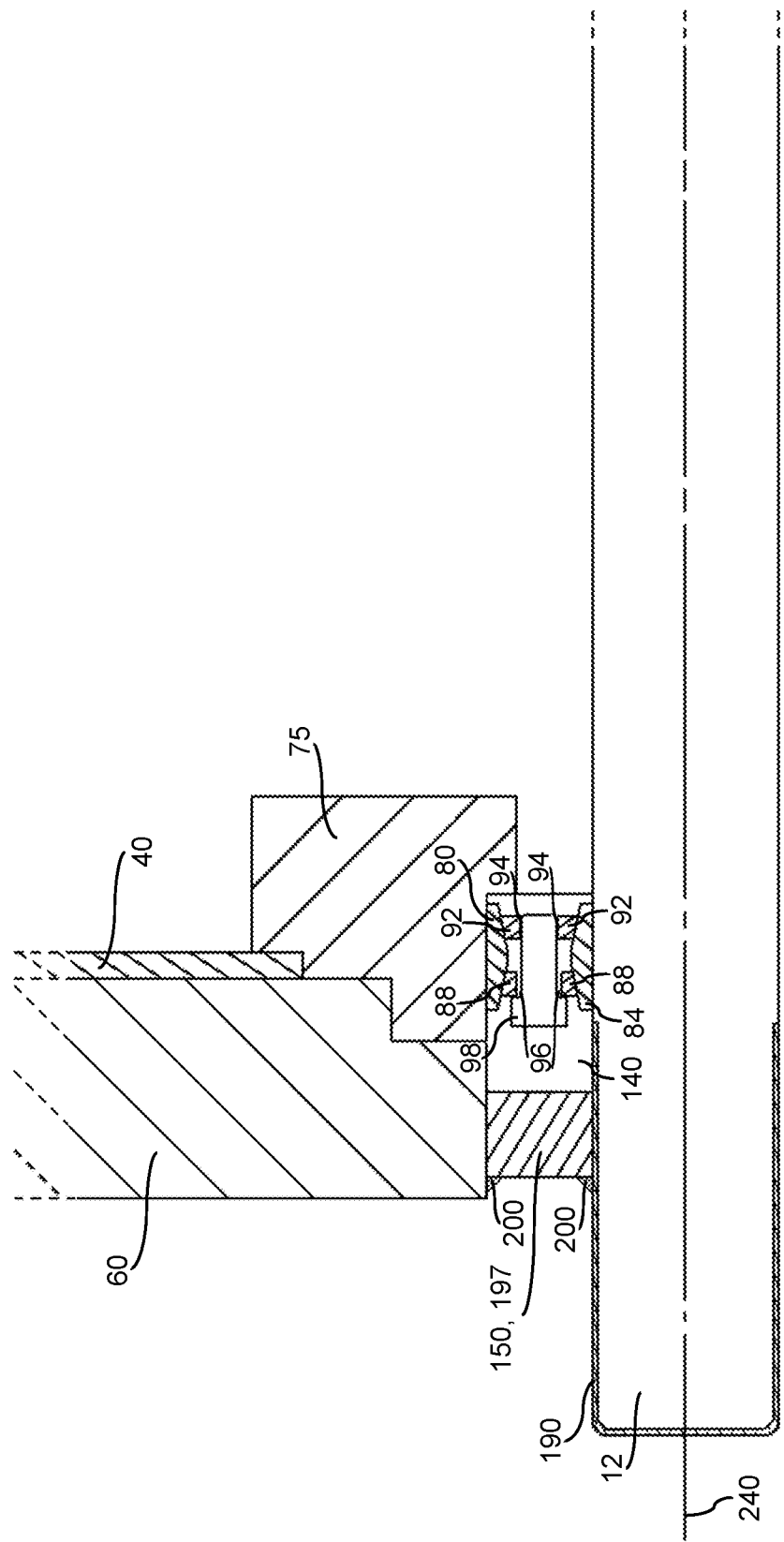

As illustrated in FIG. 7, the sealing device 150 may be formed of a sealing ring 197 which is made of a plastic ring material or which is equipped with a coating of a plastic ring coating material and which is sealed by a crosslinking sealing 200 between the cover ring plate 60, 70 and the drive shaft 12 and/or the plastic coating 190 of the drive shaft 12, which (crosslinking sealing 200), for example, may be a sealing adhesive bond or a sealing welding. As a result of the crosslinking sealing 200, a non-load-bearing fluid sealing is created/established between the respective sealing ring 197 and the drive shaft 12 and/or the coating 190 of the drive shaft 12 and the respective cover ring plate 60, 70. Hence, also a fluid sealing between the drive shaft 12 and/or the coating 190 of the drive shaft 12 and the respective cover ring plate 60, 70 is created/established.

Figure 8:
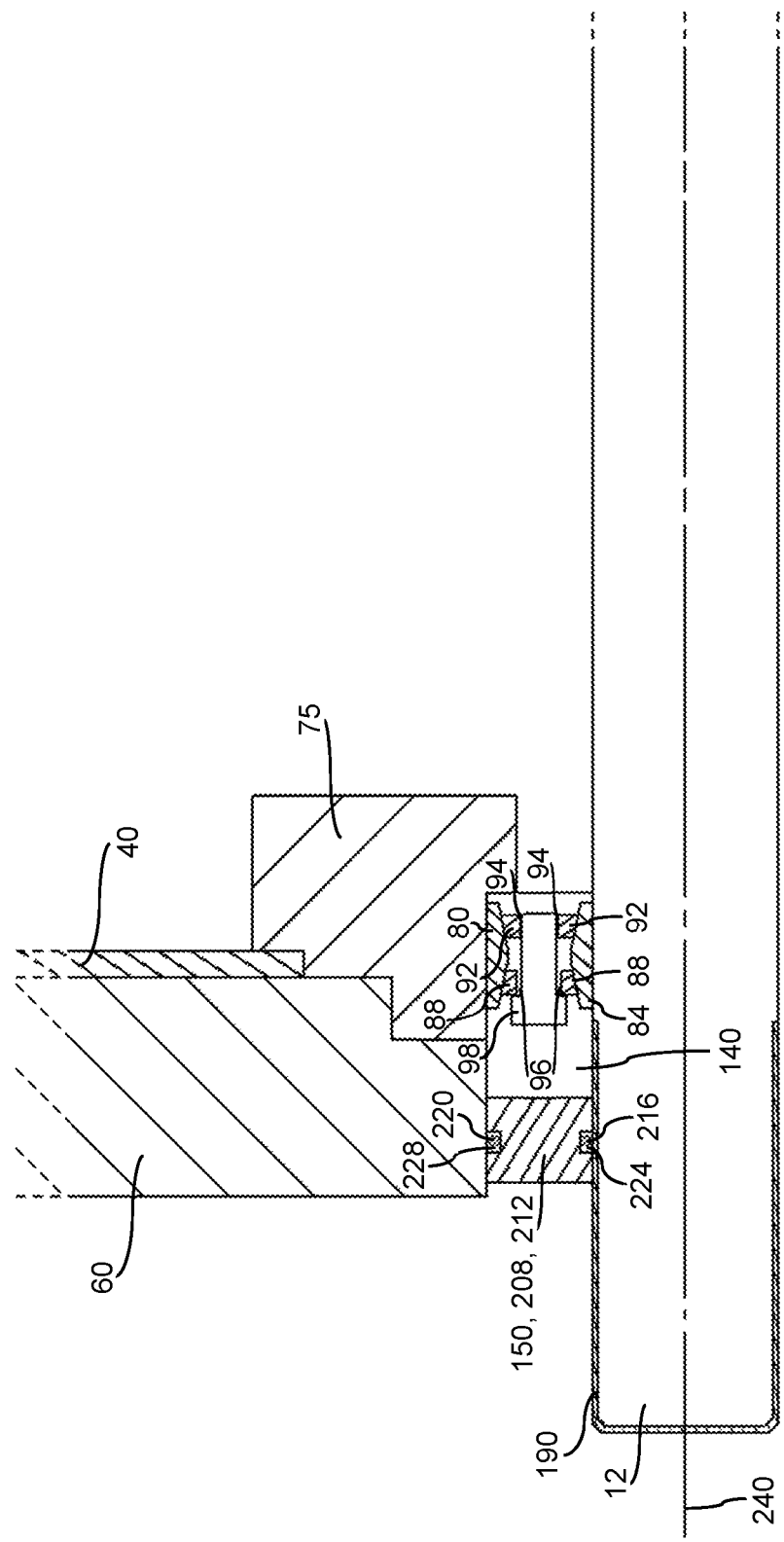

As illustrated in FIG. 8, the respective sealing device 150 may be formed by a sealing ring 208, wherein the sealing ring optionally includes a rigid ring component 212 and a radially inner 216 elastic O-ring and a radially outer 220 elastic O-ring, wherein the radially inner 216 and radially outer 220 O-rings are arranged in a radially inner groove 224 and a radially outer groove 228, respectively, which (grooves 224 and 228) are respectively formed in a tangential direction along a radially inner circumferential surface and a radially outer circumferential surface of the ring component 212, respectively. The O-rings 216, 220 are elastically biased and abut against the drive shaft 12 and/or the coating 190 of the drive shaft 12 and the respective cover ring plate 60, 70.

As illustrated in FIG. 9, the sealing device 150 may be formed in that the cover ring plate 60, 70 abuts against the drive shaft 12 and/or the coating 190 of the drive shaft 12 and is sealed against the drive shaft 12 and/or against the coating 190 of the drive shaft 12 by a crosslinking sealing 200 which, for example, may be a sealing adhesive bond or a sealing welding.

As illustrated in FIG. 10, the sealing device 150 may be formed in that the cover ring plates 60, 70 abut against the drive shaft 12 and/or against the coating 190 of the drive shaft 12 and in that an elastic O-ring 234, which is elastically biased and creates/establishes a sealing against the drive shaft 12 and/or against the coating 190 of the drive shaft 12, is arranged in a groove 230 which is formed in a tangential manner along an outer circumferential surface of the cover ring plate 60, 70.

With reference to FIG. 2, a vacuum and/or pressure filtration device 300 for the filtration of a suspension, which comprises a solid and a liquid, according to at least one embodiment, for example, includes: a filter drum 10 as previously described which, by the drive shaft 12 thereof, is rotatably supported around a shaft axis 240 which is defined by the drive shaft 12, and a driving motor M which is connected to the drive shaft 12, wherein a driving torque which is applied from the driving motor M to the drive shaft 12, is, via the first 22 and second 24 clamping ring sets (here, primarily, via the first clamping ring set 22), transmitted to the filter drum body 14. The drive shaft 12 may be supported by a first bearing 310 and a second bearing 312. The applied torque, for example, may be transmitted from the driving motor M to the drive shaft 12 by a mechanical connection K, e.g. by gears, a chain and/or a belt.

The filter drum 10, for example, may be arranged such that it rotates within a pan W, in which the suspension S, which is to be filtered, is located.

In the following, a filter drum 10 according to another embodiment is described based on FIG. 11. The embodiment of FIG. 11 substantially includes all features of the embodiments described above so that, in the following, merely the differences between these embodiments are described.

According to the embodiment of FIG. 11, the drive shaft 12 of the filter drum 10 includes a first drive shaft element 402 and a second drive shaft element 404 which are, along the drive shaft 12, axially separated from each other and are aligned to each other, wherein the drive shaft 12 is, via its first drive shaft element 402, fixedly connected, via radial clamping, to the first drum end wall 16 by the first clamping ring set 22, and wherein the drive shaft 12, via its second drive shaft element 404, is fixedly connected, via radial clamping, to the second drum end wall 18 by the second clamping ring set 24. For example, as illustrated in FIG. 11, the applied torque is transmitted, by the mechanical connection K, from the driving motor M to the first drive shaft element 402 of the drive shaft 12 so that the drive torque is only transmitted to the filter drum 10 by this first drive shaft element 402, wherein, in this case, the second drive shaft element 404 merely has the function(s) to transmit and/or receive other bearing reactions/forces.

Although the invention was described by embodiments, the invention is not limited to exactly those embodiments. Instead, the person skilled in the art will also consider alternatives and modifications as being covered by the invention provided these are within the scope defined by the claims.

LIST OF REFERENCE SIGNS

K mechanical connection
M driving motor
S suspension
W pan
10 filter drum
12 drive shaft
14 filter drum body
16 first drum end wall
18 second drum end wall
20 drum jacket wall
22 first clamping ring set
24 second clamping ring set
40 inner support ring plate
50 inner support ring plate
60 outer cover ring plate
70 outer cover ring plate
75 connection ring
80 radially inner shaft-contact ring
84 radially outer drum end wall-contact ring
88 first press ring
92 second press ring
94 threaded hole
96 through hole
98 screw
99 functional ring plate
100 discharge channel
102 filter cell
103 separator bar
110 inner support jacket
120 outer functional jacket
130 filter medium
136 discharge channel-connection opening
140 first central through hole
146 second central through hole
150 sealing device
170 drum end face-sided entrance site
176 drum end face-sided entrance site
190 plastic coating
196 sealing body
197 sealing ring
200 crosslinking sealing
208 sealing ring
212 rigid ring component
216 radially inner, elastic O-ring
218 radially outer, elastic O-ring
224 radially inner groove
228 radially outer groove
234 elastic O-ring
240 shaft axis
300 vacuum and/or pressure filtration device
310 first bearing
312 second bearing
402 first drive shaft element
404 second drive shaft element

The invention claimed is:

1. A filter drum for a vacuum and/or pressure filtration device for the filtration of a suspension, which comprises a solid and a liquid, the filter device comprising:
    a drive shaft via which the filter drum is rotatably supportable and rotatably drivable,
    a filter drum body is formed in a manner separated from the drive shaft, with respect to which the drive shaft extends centrally and the filter drum body includes
        a first drum end wall,
        a second drum end wall, and
        a drum jacket wall which extends along the drive shaft between the first drum end wall and the second drum end wall and connects the first drum end wall and the second drum end wall to each other, and
    a first clamping ring set and a second clamping ring set, corresponding to the first drum end wall and the second drum end wall, respectively, by which, in a respective manner, the first drum end wall and the second drum end wall are, via radial clamping, fixedly connected to the drive shaft so that a driving torque applied to the drive shaft is correspondingly transmittable from the drive shaft to the first drum end wall and/or the second drum end wall, and, thereby, to the filter drum body, via the first clamping ring set and/or the second clamping ring set, respectively; and
    wherein the first drum end wall and the second drum end wall each include a load-bearing inner support ring plate and an outer cover ring plate which is supported by the load-bearing inner support ring plate, the first clamping ring set and the second clamping ring set are arranged between the drive shaft and the load-bearing inner support ring plate of the respectively assigned first drum end wall and second drum end wall so that, via the first clamping ring set and/or the second clamping ring set, the driving torque is transmitted from the drive shaft to the respectively assigned load-bearing inner support ring plate and, thereby, to the filter drum body, the drum jacket wall includes a load-bearing inner support jacket and an outer functional jacket, on which a filter medium of the filter drum is arranged and via which a filtrate, occurring during filtration, is discharged and which is supported by the load-bearing inner support jacket, the load-bearing inner support jacket and the load-bearing inner support rind plates are rigidly connected to each other to thereby form a load-bearing inner structure, and the load-bearing inner structure is, by the outer functional jacket and the outer cover ring plates, encapsulated in a fluid tight manner toward the outside so as to be, during filtration operation, isolated against a touch contact with the suspension which surrounds the filter drum, and the load-bearing inner support jacket and the load-bearing inner support rind plates are formed of a metal material.

2. The filter drum according to claim 1, wherein one of the two cover ring plates is formed as a functional ring plate, in which discharge channels are formed for discharging a filtrate which occurs during filtration.

3. The filter drum according to claim 1, wherein the drum jacket wall includes a load-bearing inner support jacket and an outer functional jacket, on which a filter medium of the filter drum is arranged and via which a filtrate, occurring during filtration, is discharged and which is supported by the load-bearing support jacket.

4. The filter drum according to claim 1, wherein
the outer cover ring plates and the outer functional jacket are of a different material than the load-bearing inner support ring plates and the load-bearing inner support jacket.

5. The filter drum according to claim 1, wherein
the outer cover ring plates and the outer functional jacket are of a plastic material.

6. The filter drum according to claim 1, wherein
the outer cover ring plate and the outer functional jacket are of a plastic material, and wherein the load-bearing inner support ring plates and the load-bearing inner support jacket are of a weldable metal material and are rigidly welded to each other to thereby form the load-bearing inner structure.

7. The filter drum according to claim 1, wherein a first central through hole is defined by the load-bearing inner support ring plate as well as by the outer cover ring plate of the first drum end wall, and a second central through hole is defined by the load-bearing inner support ring plate as well as by the outer cover ring plate of the second drum end wall, the first through hole and the second through hole are respectively coaxial to the drive shaft and are penetrated by the drive shaft, and a sealing device is arranged between the drive shaft and the outer cover ring plate of both the first drum end wall and the second drum end wall, by which the respective outer cover ring plate of the first drum end wall and the second drum end wall is fluidly sealed against the drive shaft so that the load-bearing inner support ring plates, during filtration operation, are, at respective drum end face-sided entrance sites of the drive shaft into the filter drum, isolated against a contact touch with the suspension which surrounds the filter drum.

8. The filter drum according to claim 7, wherein the respective sealing device is formed by a sealing ring, wherein the sealing ring abuts against the drive shaft and the assigned outer cover ring plate.

9. The filter drum according to claim 7, wherein the respective sealing device is formed by a sealing ring, wherein the sealing ring includes a rigid ring component, a radially inner elastic O-ring and a radially outer elastic O-ring, which O-rings, in a manner elastically biased, abut against the drive shaft and the assigned outer cover ring plate.

10. The filter drum according to claim 7, wherein the drive shaft is coated with a plastic coating at least in a region of respective drum end face-sided entrance sites of the drive shaft into the filter drum, the respective outer cover ring plate is formed by a plastic plate material or is provided with a coating of a plastic plate coating material, the respective sealing device is formed by a sealing ring which is made of a plastic ring material or which is provided with a plastic ring coating material, and in the respective sealing device, the plastic ring material or the plastic ring coating material is welded to the plastic coating of the drive shaft and to the plastic plate material or the plastic plate coating material to thereby form a non-load-bearing fluid sealing between the respective sealing ring and the drive shaft and the respective outer cover ring plate.

11. The filter drum according to claim 1, wherein the load-bearing inner support ring plates and the outer cover ring plates coextend in a radial direction to form the first drum end wall and the second drum end wall, wherein the load-bearing inner support ring plates are disposed at an axially inner position relative to the outer cover ring plates, respectively.

12. The filter drum according to claim 1, wherein the load-bearing inner support ring plates extend radially from the first clamping ring set and the second clamping ring set, respectively, to the drum jack wall and the load-bearing inner support ring plates are connected to the drum jack wall, wherein the load-bearing inner support ring plates are disposed at an axially inner position relative to the outer cover ring plates respectively.

13. The filter drum according to claim 1, wherein the metal material for the load-bearing inner support jacket and the load-bearing inner support ring plates is a weldable metal material and the load-bearing inner support jacket and the load-bearing inner support ring plates are welded to each other to thereby form the load-bearing inner structure, and the outer functional jacket and the outer cover ring plates are welded to each other to encapsulate the load-bearing inner structure in a fluid tight manner.

14. The filter drum according to claim 13, wherein the outer functional jacket and the outer cover ring plates are formed of or coated with a plastic material and are welded to each other via the plastic material, and wherein the plastic weld connections are not load-bearing.

15. The filter drum according to claim 1, wherein the load-bearing inner support ring plates are connected directly to the drum jacket wall.

16. A vacuum and/or pressure filtration device for the filtration of a suspension, which comprises a solid and a liquid, the vacuum and/or pressure filtration device comprising:
    a filter drum including
    a drive shaft via which the filter drum is rotatably supportable and rotatably drivable,
    a filter drum body is formed in a manner separated from the drive shaft, with respect to which the drive shaft extends centrally and the filter drum body includes
    a first drum end wall,
    a second drum end wall,
    a drum jacket wall which extends along the drive shaft between the first drum end wall and the second drum end wall and connects the first drum end wall and the second drum end wall to each other, and
    a first clamping ring set and a second clamping ring set, corresponding to the first drum end wall and the second drum end wall, respectively, by which, in a respective manner, the first drum end wall and the second drum end wall are, via radial clamping, fixedly connected to the drive shaft so that a driving torque applied to the drive shaft is correspondingly transmittable from the drive shaft to the first drum end wall and/or the second drum end wall, and, thereby, to the filter drum body, via the first clamping ring set and/or the second clamping ring set, respectively, wherein the filter drum is rotatably supported by the drive shaft around a shaft axis which is defined by the drive shaft; and
    a driving motor which is connected to the drive shaft, wherein a driving torque applied to the drive shaft by the driving motor is transmitted to the filter drum body via the first clamping ring set and/or the second clamping ring set, and
    wherein the first drum end wall and the second drum end wall each include a load- bearing inner support ring plate and an outer cover ring plate which is supported by the load-bearing inner support ring plate, wherein the first clamping ring set and the second clamping ring set are arranged between the drive shaft and only the load-bearing inner support ring plate of the respectively assigned first drum end wall and second drum end wall so that, via the first clamping ring set and/or the second clamping ring set, the driving torque is transmitted from the drive shaft to the respectively assigned load-bearing inner support ring plate and, thereby, to the filter drum body,
    the drum jacket wall includes a load-bearing inner support jacket and an outer functional jacket, on which a filter medium of the filter drum is arranged and via which a filtrate, occurring during filtration, is discharged and which is supported by the load- bearing inner support jacket,
    the load-bearing inner support jacket and the load-bearing inner support ring plates are rigidly connected to each other to thereby form a load-bearing inner structure, and the load-bearing inner structure is, by the outer functional jacket and the outer cover ring plates, encapsulated in a fluid tight manner toward the outside so as to be, during filtration operation, isolated against a touch contact with the suspension which surrounds the filter drum, and
    the load-bearing inner support jacket and the load-bearing inner support ring plates are formed of a metal material.

17. The vacuum and/or pressure filtration device according to claim 16, wherein the load-bearing inner support ring plates and the outer cover ring plates coextend in a radial direction to form the first drum end wall and the second drum end wall, wherein the load-bearing inner support ring plates are disposed at an axially inner position relative to the outer cover ring plates respectively.

18. The vacuum and/or pressure filtration device according to claim 16, wherein the load-bearing inner support ring plates extend radially from the first clamping ring set and the second clamping ring set, respectively, to the drum jack wall and the loadbearing inner support ring plates are connected to the drum jack wall, wherein the loadbearing inner support ring plates are disposed at an axially inner position relative to the outer cover ring plates respectively.

\* \* \* \* \*